(12) United States Patent
Smith

(10) Patent No.: US 8,489,432 B1
(45) Date of Patent: Jul. 16, 2013

(54) SYSTEMS AND METHODS FOR A SELF INSURANCE ACCOUNT

(75) Inventor: Arthur Quentin Smith, Fredericksburg, TX (US)

(73) Assignee: United Services Automobile Association, San Antonio, TX (US)

( * ) Notice: Subject to any disclaimer, the term of this patent is extended or adjusted under 35 U.S.C. 154(b) by 485 days.

(21) Appl. No.: 11/925,244

(22) Filed: Oct. 26, 2007

(51) Int. Cl.
  *G06D 40/00* (2012.01)
(52) U.S. Cl.
  USPC .................................................. 705/4; 705/35
(58) Field of Classification Search
  USPC .................................................... 705/1, 4, 35
  See application file for complete search history.

(56) References Cited

U.S. PATENT DOCUMENTS

| | | | | |
|---|---|---|---|---|
| 4,642,768 | A | 2/1987 | Roberts | 364/408 |
| 5,761,645 | A * | 6/1998 | Hawkins | 705/4 |
| 5,913,198 | A * | 6/1999 | Banks | 705/36 R |
| 6,009,402 | A | 12/1999 | Whitworth | 705/4 |
| 6,026,364 | A | 2/2000 | Whitworth | 705/4 |
| 7,143,051 | B1 | 11/2006 | Hanby et al. | 705/4 |
| 7,516,079 | B2 * | 4/2009 | Harrison et al. | 705/4 |
| 2004/0010426 | A1 | 1/2004 | Berdou | |
| 2005/0060208 | A1 | 3/2005 | Gianantoni | |
| 2008/0120143 | A1 | 5/2008 | Beauregard et al. | |

OTHER PUBLICATIONS

U.S. Appl. No. 11/925,083, Non Final Office Action mailed Nov. 13, 2009, 17 pgs.
U.S. Appl. No. 11/925,083, Response filed Feb. 16, 2010 to Non Final Office Action mailed Nov. 13, 2009, 12 pgs.
U.S. Appl. No. 11/925,358, Final Office Action mailed May 19, 2009, 10 pgs.
U.S. Appl. No. 11/925,358, Non Final Office Action mailed Jan. 6, 2009, 7 pgs.
U.S. Appl. No. 11/925,358, Response filed Apr. 2, 2009 to Non Final Office Action mailed Jan. 6, 2009, 9 pgs.
U.S. Appl. No. 11/925,083 Final Office Action mailed Jul. 23, 2010, 16 pgs.
U.S. Appl. No. 11/925,083, Non Final Office Action mailed Apr. 18, 2011, 16 pgs.
U.S. Appl. No. 11/925,083, Response filed Oct. 25, 2010 to Final Office Action mailed Jul. 23, 2010, 10 pgs.

* cited by examiner

*Primary Examiner* — Alexander Kalinowski
*Assistant Examiner* — Kellie Campbell
(74) *Attorney, Agent, or Firm* — Schwegman Lundberg & Woessner, P.A.

(57) ABSTRACT

Insurance customers may establish and contribute to a self-insurance account. The insured may set aside an amount each policy period that is deposited to the self-insurance account. The value of the self-insurance account may further grow in value with earnings via common investment vehicles. The deposits and investment growth may continue until the account reaches maturity (self-insurance status). From that point forward customers can forego paying insurance premiums. The self-insurance account is accessible to the insured as a financial asset, and may be provided to the insured upon termination of the self-insurance account.

18 Claims, 5 Drawing Sheets

SYSTEMS AND METHODS FOR A SELF INSURANCE ACCOUNT

CROSS-REFERENCE TO RELATED APPLICATIONS

This application is related by subject matter to the subject matter disclosed in the following commonly assigned applications, the entirety of which are hereby incorporated by reference herein: U.S. patent application Ser. No. 11/925,083 and U.S. patent application Ser. No. 11/925,358, each filed on Oct. 26, 2007 and each entitled "Systems And Methods For A Self Insurance Account."

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2007, USAA.

BACKGROUND

Consumers today must be prepared for sudden and unexpected events that place them at risk for a sudden loss. For example, an unexpected accident associated with the consumer's automobile or home may create significant liability for a consumer. Few people have sufficient wealth to protect themselves against such loss. Thus, insurance is an important part of a consumer's financial planning. For example, liability insurance may typically cover an individual for hundreds of thousands of dollars. There are many types of insurance, but most provide a form of risk management to hedge against the risk of a catastrophic loss. In the face of the many common risks associated with daily life—floods, fire, auto accidents, and illness—insurance provides a means for consumers to plan for the future with the assurance of knowing that they are protected should an unexpected loss occur.

Most individuals purchase insurance through an insurer, which is a company that sells an insurance policy. Individuals must pay an amount based upon an insurance rate which is a factor used to determine a premium to be charged for a certain amount of insurance coverage. Individuals typically have several types of insurance to provide coverage for various types of claims.

Thus, most individuals will pay for various types of insurance, typically for decades over the course of a lifetime. If such an individual only files a few claims, then the individual may pay a substantial amount of money that is never recovered in terms of actual losses. For example, an individual may, over 40 years, pay a minimum of $40,000 for automobile insurance, and will typically not recover the amount paid. Many consumers may thus desire to accumulate the means to achieve self-insurance status, in a manner that may allow the consumer to recover the value of the accumulation in the event that the risk of loss is not realized.

SUMMARY

Systems and methods are provided whereby insurance customers may establish and contribute to a self-insurance account. In one embodiment, the insured may set aside an amount each policy period that is deposited to the self-insurance account. The value of the self-insurance account may further grow in value with earnings via common investment vehicles. The deposits and investment growth may continue until the account reaches maturity (self-insurance status). From that point forward customers can forego paying insurance premiums. The self-insurance account is accessible to the insured as a financial asset, and may be provided to the insured upon termination of the self-insurance account.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the subject matter is not limited to the specific methods and instrumentalities disclosed. In the drawings.

DETAILED DESCRIPTION

Figure 1:
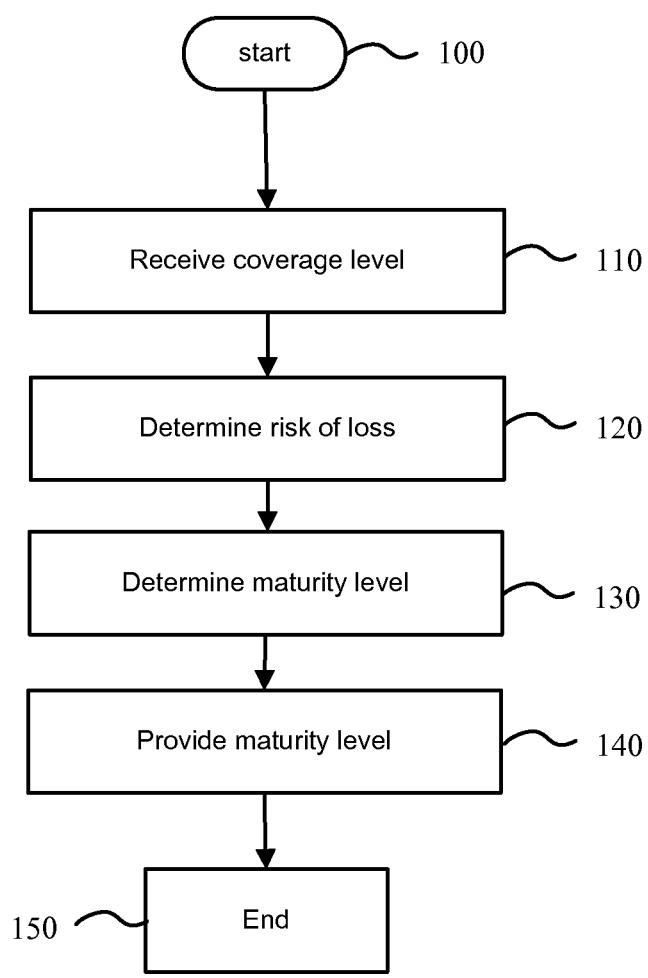
FIG. 1 is a flow diagram of an exemplary, non-limiting method of determining a maturity level of a self-insurance account.

The subject matter of the described embodiments is described with specificity to meet statutory requirements. However, the description itself is not intended to limit the scope of this patent. Rather, the inventor has contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Insurance is a form of risk management primarily used to hedge against the risk of a sudden loss. Insurance is typically defined as the transfer of the risk of a loss in exchange for a premium paid by the insured. For example, a popular form of insurance is automobile insurance, which is a form of insurance purchased for cars, trucks, and other vehicles. The primary purpose of automobile insurance is to provide protection against losses incurred as a result of a traffic accident. Other general types of insurance include property, liability and medical insurance. For example, homeowners insurance can cover fire, weather-related destruction and other losses, depending on the coverage purchased.

The insurance industry consists mainly of insurance carriers (or insurers) and insurance agencies and brokerages. In general, insurance carriers are large companies that provide insurance and assume the risks covered by the policy. Insurance agencies and brokerages sell insurance policies for the carriers. While some of these establishments are directly affiliated with a particular insurer and sell only that carrier's policies, many are independent and thus may provide the policies of a variety of insurance carriers.

Insurance carriers assume the risk associated with insurance policies and assign premiums to be paid for the policies. In a typical insurance policy, the carrier may determine a term of length for the policy, terms and conditions for the agreement, what types of losses will be covered, and the amount that will be awarded in the event of a loss. The premium charged for the policy is based primarily on the amount to be awarded in case of loss, as well as the likelihood that the loss will occur and the likelihood that the insurance carrier will actually have to pay. In order to be able to compensate policyholders for their losses, insurance companies invest the money they receive as premiums, building up a portfolio of financial assets and income-producing real estate, which can then be used to pay off any future claims.

The cost of premiums varies widely, depending on the risk involved. In the case of automobile insurance, insurers typically evaluate claims statistics and relate premiums to the degree of risk derived from the statistics. Typically there are four main factors in calculating automobile insurance premiums: the type of car, the driver profile, use of the car, and location of the car. In addition, the premium may also be affected by the driver's occupation, accident record, and history of traffic violations.

As described above, most consumers need various types of liability insurance to cover themselves against losses that may occur. The potential losses that a consumer may face can be significant, and thus most individuals purchase insurance through an insurer. Individuals typically pay an amount based upon an insurance rate which is a factor used to determine the premium to be charged for a certain amount of insurance coverage. Thus, most individuals will pay for various types of insurance, typically for decades over the course of a lifetime. If such an individual only files a few claims, then the individual may pay for an amount that is never recovered in terms of actual losses. For example, an individual may, over 40 years, pay a minimum of $40,000 for an automobile insurance policy. If the individual never files any claims, the amount paid for the insurance policy will generally not be recovered.

An alternative to purchasing insurance in the manner described above is for the individual to be able to self-insure. In this case, the individual possesses sufficient assets to pay for any potential loss or liability. If the individual never experiences such a loss or liability, then the individual will have saved the amount he/she would have spent in paying for premiums. However, few consumers possess sufficient assets to self-insure.

Systems and methods are provided herein whereby insurance customers may establish and deposit funds into a self-insurance account. In one embodiment, the insured may set aside an amount each policy period that is deposited into an account. The amount deposited may accumulate earnings via common investment vehicles and continue to grow until the account reaches maturity (self-insurance status). From that point forward, customers can forego paying further insurance premiums and continue to be covered for the type of coverage provided by the self-insurance account. Furthermore, the customer can access the value of the account, which can be provided to the customer upon request, thus providing a strong financial asset.

The ability of a self-insurance account to provide the desired mitigation against loss is due to the fact that a significant amount of the value of a self-insurance account is not used because of low cost claims. A sufficient number of pooled self-insurance accounts can provide for protection against large losses because such large losses are relatively rare compared to low cost losses. In general, the maturity level of a self-insurance account is determined by the total amount needed to account for estimated expected losses, divided by the number of persons to be insured. The amount determined as the maturity level may also depend on state and local guidelines.

Once a maturity level is determined, the account holder may be provided an option to deposit the entire amount by depositing a lump sum into the account. The self-insurance account holder may be offered additional incentives to provide a lump sum payment, such as a fee discount. Alternatively, the amount of the maturity level may be accumulated by determining a periodic deposit amount. The amount of the periodic deposit may be determined by considering the type of investment, the desired time to maturity, and a maximum payment amount specified by the account holder.

In one embodiment, various triggering events may be used to determine when to deposit money into the self-insurance account. Triggering events can be linked to significant events such as receipt of a large sum of money, receipt of life insurance benefits, or the age of an account holder's children. For example, a consumer may desire to prepay and establish an automobile self-insurance account to prepare for a 15 year old child who will soon obtain a driver's license. Alternatively, a consumer may be provided an option to contribute to a self-insurance account when the consumer receives a life insurance payout.

In another embodiment, the self-insurance account may be pooled with other self-insurance accounts. In this manner, a plurality of self-insurance accounts may provide insurance protection for larger coverage amounts than may be possible with a single self-insurance account. In another aspect of this embodiment, the account holder may be provided the option of identifying other account holders with whom the consumer desires to pool. For example, an account holder may desire to open self-insurance accounts with family members.

In another embodiment, the premium can be coupled to another financial product, wherein the consumer may be provided an incentive to participate in a self-insurance program in conjunction with a financial product such as a home equity loan. Another example may be to package an automobile self-insurance account with a life insurance account, whereby the consumer may be provided an incentive to purchase both types of insurance. In this case, a single periodic premium may comprise a component that is deposited to the life insurance account, and another component contributed to the automobile self-insurance account.

Various other combinations of products may be provided. For example, since a newly established self-insurance account may not have had sufficient time to accrue an amount sufficient to cover a desired coverage level, the account provider may provide a traditional insurance policy until the consumer accumulates sufficient funds to provide a level of self-insurance.

As discussed above, the deposits made by the account holder may be invested in various investment vehicles as determined by the insurance provider. In various embodiments, all or part of the insurance premium can be deposited to an interest bearing account, a managed investment fund, or other investment vehicles. For example, the account may operate as an annuity wherein a guaranteed minimum annual growth is provided, for example 6% per year. Optionally, the self-insurance account holder may be provided options to invest portions of the account value in different investment vehicles. Account holders may further be provided more aggressive investment options or more conservative investment options. Additionally and optionally, the growth of the fund can be increased by depositing additional amounts, which may further lower the periodic payment amount.

In some cases the provider of the self-insurance account may receive a fee for providing the account, such as a percentage of the increase in value of the self-insurance account. Such fees may be desired when the self-insurance account is provided by a carrier that only provides such self-insurance services. In other cases, the self-insurance account may be provided by an institution that provides multiple financial products, and the self-insurance accounts may be provided as a service to its members. Financial institutions may benefit by providing such self-insurance accounts as a differentiating service. Additionally, the coupling of the self-insurance account may provide an incentive for consumers to purchase other products provided by the institution.

In another aspect, it may be possible that such accounts may qualify for tax deferral benefits. For example, depending upon whether the appropriate tax code provisions are adopted, the amount deposited into a self-insurance account may be tax deferred, thus providing further incentives to consumers to open self-insurance accounts and increasing their appeal.

When the consumer decides to terminate the self-insurance account, the value of the account may be provided to the consumer. The insurance provider may further provide various options for withdrawal of the funds. For example, if the self-insurance account is tax deferred, then the payment of the account to the insured may result in increased tax liability. In such a case, the insured may be provided the option to deposit the value of the account into an Individual Retirement Account (IRA).

FIG. 1 depicts an exemplary process for determining a maturity level for a self-insurance account. Beginning at operation 100, the process may receive a desired coverage level 110 for the insurance policy. Examples of such coverage levels may include a liability level, a maximum damage level, or a personal injury protection level. Next, in operation 120 the process may determine the risks associated with the received coverage levels. This determination may include analysis of claims statistics for losses of the type covered. The determination may further account for various factors such as the account holder's profile, and in the case of automobile insurance, the use and location of the car. Next, in operation 130, the maturity level may be determined as a function of the desired amount of insurance coverage, the risk of loss estimated in operation 120, an estimated rate of growth of the fund depending upon the type of investment, a desired maturity achievement date, and a maximum periodic payment identified by the account holder. Various other factors can be used in determining the maturity level. Finally, in operation 140, the maturity level can be provided to the insurance provider and/or the self-insurance account holder, and the results may be stored for further and future processing before the process ends at operation 150.

Figure 2:
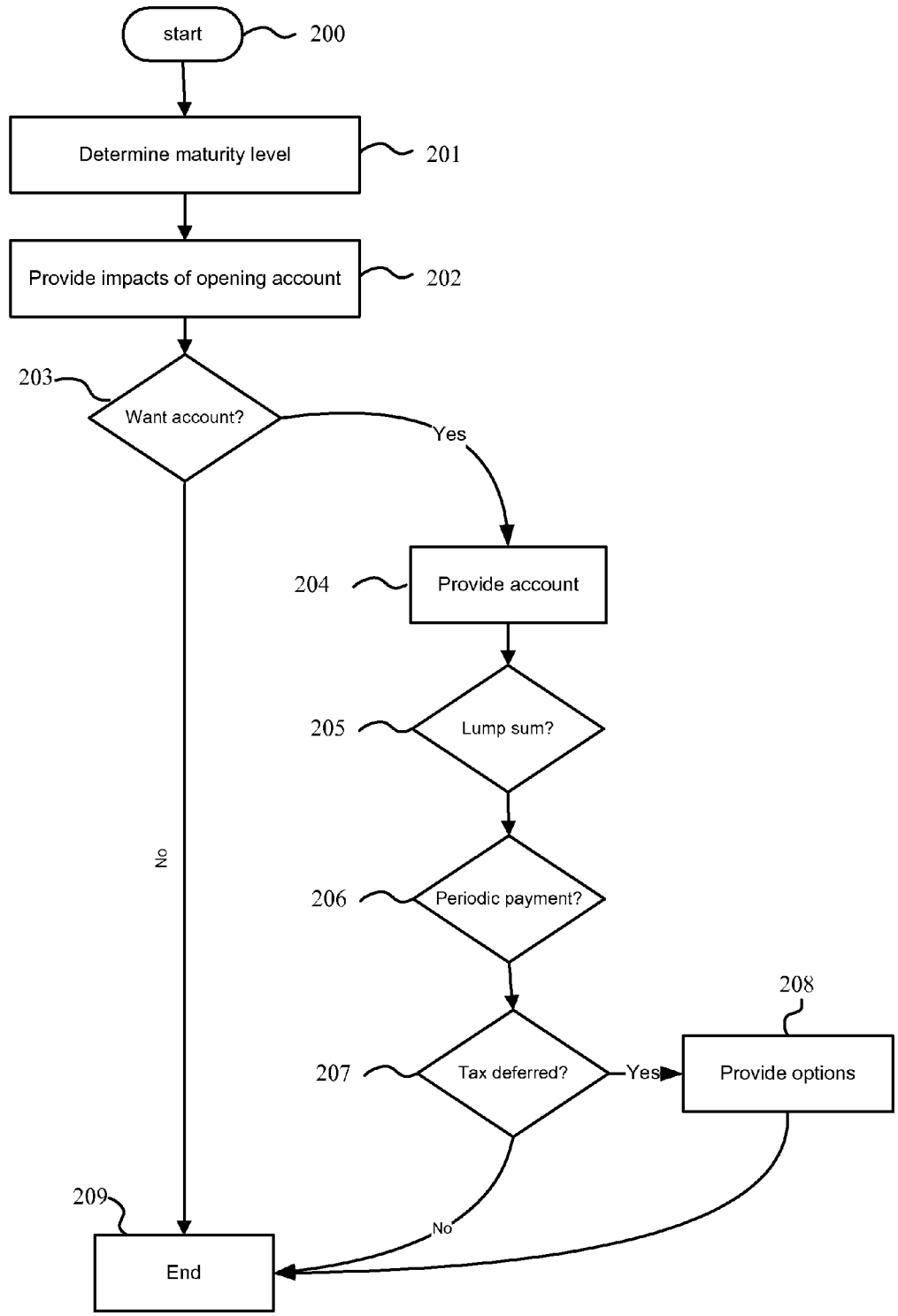
FIG. 2 is a flow diagram of an exemplary, non-limiting method of providing and maintaining a self-insurance account.

Turning to FIG. 2, illustrated is an exemplary process for providing and maintaining a self-insurance account in accordance with the methods and systems described herein. Beginning at operation 200, a maturity level for the desired type of coverage may be determined in operation 201. A process similar to the operations described above in FIG. 1 may be used. Next, in operation 202, the insurance provider may provide financial and other impacts of opening the account to the proposed insured. Such impacts may include the various benefits and costs associated with opening the self-insurance account, such as tax benefits. Next, in operation 203, the process determines if the proposed insured desires to open the self-insurance account. If the proposed insured declines to open the self-insurance account, then the process ends at operation 209. If the proposed insured accepts the offer to open the self-insurance account, then in operation 204 the process opens and provides the self-insurance account.

In operation 205, the account holder may be provided the option of depositing the entire maturity level amount as a lump sum. Alternatively, the account holder may be provided the option of making periodic deposits in operation 206. The account holder may also be provided options for tax deferrals in operation 207 if such options are available. If the account holder desires the tax deferred option, then the insurance provider may provide further options in operation 208 such as making a pre-tax deposit, or making an after-tax deposit. After entry of the various payment options the process ends at operation 209.

Figure 3:
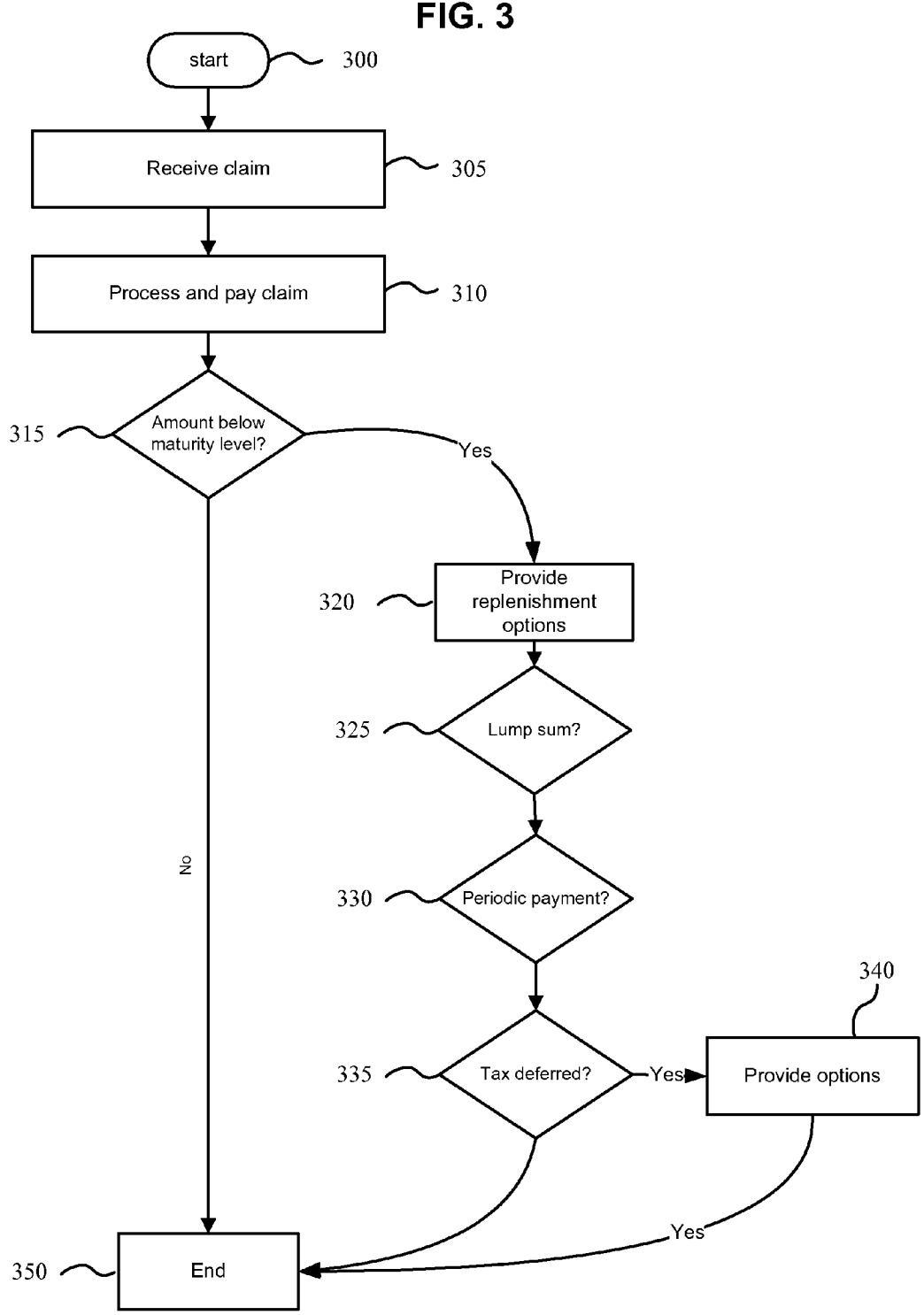
FIG. 3 is a flow diagram of an exemplary, non-limiting method of processing a claim in conjunction with a self-insurance account.

Turning now to FIG. 3, illustrated is an exemplary process for processing an insurance claim in conjunction with a self-insurance account. Beginning at operation 300, the insurance provider may receive a claim for a loss or other compensation for the benefit of the holder of the self-insurance account in operation 305. The insurance provider may then process and pay the claim in operation 310 using funds from the self-insurance account. The insurance provider may then determine in operation 315 whether the payment of the claim has brought the self-insurance account below the maturity level of the account. The maturity level may be determined in a manner similar to the process described in FIG. 1 above. If the value of the account remains above the maturity level, then the process may end at operation 350.

If the value of the account has fallen below the maturity level, then the account holder may be provided various options for replenishing the account in operation 320. In operation 325, the account holder may be provided the option of depositing the entire discrepancy amount as a lump sum. Alternatively, the account holder may be provided the option of making periodic deposits in operation 330. The account holder may also be provided options for tax deferrals in operation 335 if such options are available. If the account holder desires the tax deferred option, then the insurance provider may provide further options in operation 340 such as making a pre-tax deposit, or making an after-tax deposit. After entry of the various payment options, the process ends at operation 350.

Exemplary Computing and Networking Environment

Figure 4:
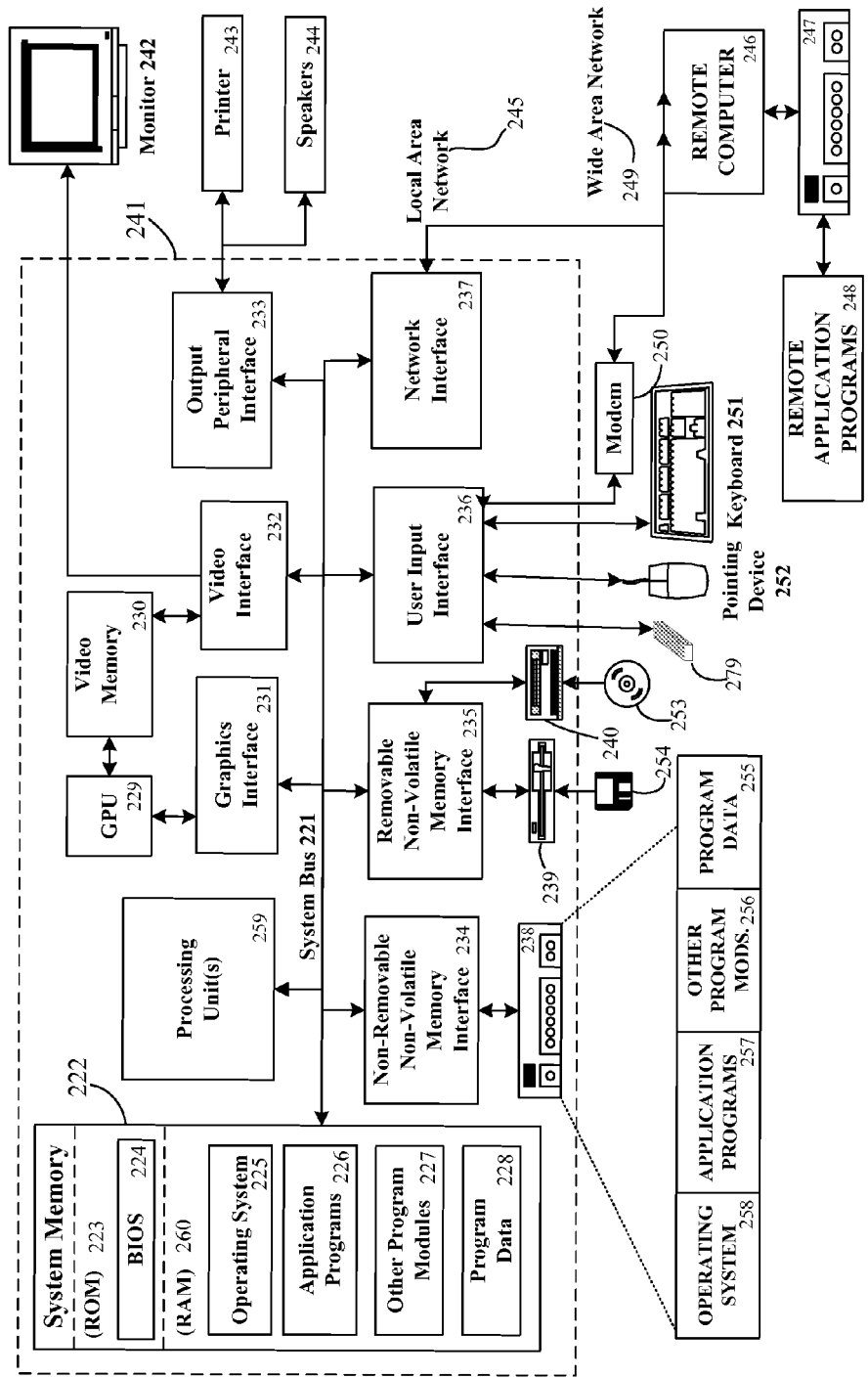
FIGS. 4 and 5 are diagrams illustrating example systems in which aspects of the described embodiments may be incorporated.

Referring to FIG. 4, shown is a block diagram representing an exemplary computing device suitable for use in conjunction with implementing the systems and methods described above. For example, computer executable instructions that carry out the processes and methods for printing checks at home may reside and/or be executed in such a computing environment as shown in FIG. 4. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. For example, a computer game console may also include those items such as those described below for use in conjunction with implementing the processes described above.

Aspects of the presently disclosed subject matter are operational with numerous other general purpose or special purpose computing system environments or configurations. Examples of well-known computing systems, environments, and/or configurations that may be suitable for use with this subject matter include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that perform particular tasks or implement particular abstract data types. Aspects of the presently disclosed subject matter may also be practiced in distributed computing environments where tasks are performed by remote processing devices linked through a communications network. In a distributed computing environment, program modules may be located in both local and remote computer storage media, including memory storage devices.

An exemplary system for implementing aspects of the presently disclosed subject matter includes a general purpose computing device in the form of a computer 241. Components of computer 241 may include, but are not limited to, a processing unit 259, a system memory 222, and a system bus 221 that couples various system components, including the system memory, to the processing unit 259. The system bus 221 may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. In some embodiments, the exemplary system may additionally include a graphics interface 231 that renders graphics, video memory 230 that can be used to cache graphics, and a GPU 229 that executes the instructions to render graphics.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules, or other data. Computer storage media include, but are not limited to, random access memory (RAM), read only memory (ROM), electrically erasable programmable read-only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 241. Communication media typically embody computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 222 includes computer storage media in the form of volatile and/or nonvolatile memory such as ROM 223 and RAM 260. A basic input/output (BIOS) system 224, containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball, or touch pad. Furthermore, a user may provide additional data by using a portable memory device 279. Such memory devices may include, but are not limited to, universal serial bus (USB) memory sticks and compact flash memory devices. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port, or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a PC, a server, a router, a network PC, a peer device, or other common network node, and typically includes many or all the elements described above relative to the computer 241, although only a memory storage device 247 has been illustrated in FIG. 4. The logical connections depicted in FIG. 4 include a local area network (LAN) 245 and a wide area network (WAN) 249, but may also include other networks. Such networking environments are commonplace in offices, enterprise-wide computer networks, intranets, and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236 or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or use the processes described in connection with the presently disclosed subject matter, e.g., through the use of an API, reusable controls, or the like. Such programs are preferably implemented in a high-level procedural or object-oriented programming language to communicate with a computer system. However, the program(s) can be implemented in assembly or machine language, if desired. In any case, the language may be a compiled or interpreted language and combined with hardware implementations.

Although exemplary embodiments may refer to using aspects of the presently disclosed subject matter in the context of one or more stand-alone computer systems, the said subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, handheld devices, supercomputers, or computers integrated into other systems such as automobiles and airplanes.

In light of the diverse computing environments that may be built according to the general framework provided in FIG. 4, the systems and methods provided herein cannot be construed as limited in any way to a particular computing architecture. Instead, the presently disclosed subject matter should not be limited to any single embodiment, but rather should be construed in breadth and scope in accordance with the appended claims.

Figure 5:
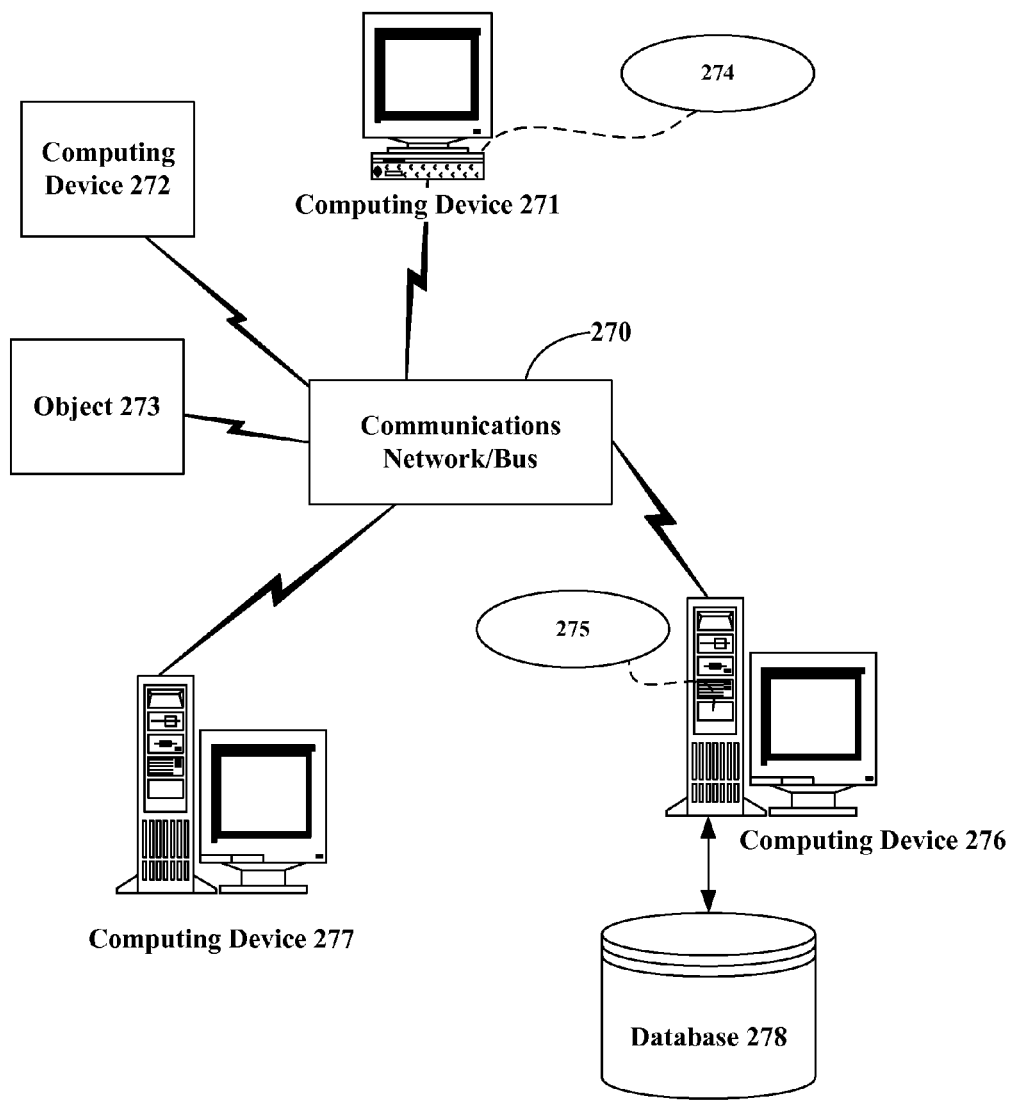

Referring next to FIG. 5, shown is an exemplary networked computing environment in which many computerized processes may be implemented to perform the processes described above. For example, parallel computing may be part of such a networked environment with various clients on the network of FIG. 5 using and/or implementing the defining and extracting of a flat list of search properties from a rich structured type. One of ordinary skill in the art can appreciate that networks can connect any computer or other client or server device, or in a distributed computing environment. In this regard, any computer system or environment having any number of processing, memory, or storage units, and any number of applications and processes occurring simultaneously, is considered suitable for use in connection with the systems and methods provided.

Distributed computing provides sharing of computer resources and services by exchange between computing devices and systems. These resources and services include the exchange of information and storage for files. Distributed computing takes advantage of network connectivity, allowing clients to leverage their collective power to benefit the entire enterprise. In this regard, a variety of devices may have applications, objects, or resources that may implicate the processes described herein.

FIG. 5 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277, and 278 may comprise or make use of programs, methods, data stores, programmable logic, etc. The entities 271, 272, 273, 274, 275, 276, 277, and 278 may span portions of the same or different devices such as personal digital assistants (PDAs), audio/video devices, MPEG-1 Audio Layer 3 (MP3) players, personal computers, etc. Each entity 271, 272, 273, 274, 275, 276, 277, and 278 can communicate with another entity 271, 272, 273, 274, 275, 276, 277, and 278 by way of the communications network 270. In this regard, any entity may be responsible for the maintenance and updating of a database 278 or other storage element.

This communications network 270 may itself comprise other computing entities that provide services to the system of FIG. 5, and may itself represent multiple interconnected networks. In accordance with an aspect of the presently disclosed subject matter, each entity 271, 272, 273, 274, 275, 276, 277, and 278 may contain discrete functional program modules that might make use of an API, or other object, software, firmware, and/or hardware, to request services of one or more of the other entities 271, 272, 273, 274, 275, 276, 277, and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, Component Object Model (COM) objects, and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a consumer of a class or group that uses the services of another class or group to which it is not related. In computing, a client is a process, i.e., roughly a set of instructions or tasks, that requests a service provided by another program. The client process uses the requested service without having to "know" any working details about the other program or the service itself. In a client/server architecture, particularly a networked system, a client is usually a computer that accesses shared network resources provided by another computer, e.g., a server. In the example of FIG. 5, any entity 271, 272, 273, 274, 275, 276, 277, and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another using the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via Transmission Control Protocol/Internet Protocol (TCP/IP) connection(s) for high-capacity communication.

In light of the diverse computing environments that may be built according to the general framework provided in FIG. 5 and the further diversification that can occur in computing in a network environment such as that of FIG. 5, the systems and methods provided herein cannot be construed as limited in any way to a particular computing architecture or operating system. Instead, the presently disclosed subject matter should not be limited to any single embodiment, but rather should be construed in breadth and scope in accordance with the appended claims.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the disclosed embodiments. In the case of program code execution on programmable computers, the computer will generally include a processor, a storage medium readable by the processor (including volatile and non-volatile memory and/or storage elements), at least one input device and at least one output device. One or more programs are preferably implemented in a high-level procedural or object-oriented programming language to communicate with a computer system. However, the program(s) can be implemented in assembly or machine language, if desired. In any case, the language may be a compiled or interpreted language and combined with hardware implementations.

The described methods and apparatus may also be embodied in the form of program code that is transmitted over some transmission medium, such as over electrical wiring or cabling, through fiber optics, wireless transmission, or via any other form of transmission, wherein, when the program code is received and loaded into and executed by a machine, such as an EPROM, a gate array, a programmable logic device (PLD), a client computer, a video recorder or the like, the machine becomes an apparatus for practicing the methods and systems disclosed. When implemented on a general-purpose processor, the program code combines with the processor to provide a unique apparatus that operates to perform the processing of the disclosed embodiments.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, processes and methods were described at least for a self insurance account. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A system for providing a self-insurance account, said self-insurance account configured to provide at least one type of insurance coverage to an insured, the system comprising:
   one or more processors;
   at least one subsystem, executed on said one or more processors, configured to receive a desired liability coverage level for automobile insurance coverage;
   at least one subsystem, executed on said one or more processors, configured to determine a risk of loss associated with said received desired coverage level, the risk of loss determined in part based on a profile of a driver of a vehicle covered by the automobile insurance coverage;
   at least one subsystem, executed on said one or more processors, configured to determine a maturity level for said self-insurance account based on a function of said received desired liability coverage level, said risk of loss associated with the received desired coverage level, and an expected rate of growth of an investment vehicle;

at least one subsystem, executed on said one or more processors, configured to receive deposit payments for said self-insurance account;

at least one subsystem, executed on said one or more processors, configured to invest at least part of an amount in said self-insurance account in said investment vehicle;

at least one subsystem, executed on said one or more processors, configured to provide an option to discontinue said payments into said account when said amount in said account reaches said maturity level;

at least one subsystem, executed on said one or more processors, configured to maintain said self-insurance account to provide said at least one type of insurance;

at least one subsystem, executed on said one or more processors, configured to provide a value of said self-insurance account to said insured in response to a request from said insured; and at least one subsystem, executed on said one or more processors, configured to terminate said self-insurance account in response to a termination request.

2. The system of claim 1, wherein said at least one subsystem configured to receive deposit payments is further configured to receive periodic payments.

3. The system of claim 1, wherein said at least one subsystem configured to receive deposit payments is further configured to receive a lump sum payment.

4. The system of claim 1, wherein said investment vehicle is a tax deferred vehicle.

5. The system of claim 1, wherein said self-insurance account is coupled with another financial product.

6. The system of claim 1, wherein said at least one subsystem configured to receive deposit payments is further configured to receive deposit payments in conjunction with at least one triggering event.

7. A method of providing a self-insurance account, said self-insurance account configured to provide at least one type of insurance coverage to an insured, the method comprising:
   executing instructions stored on a non-transitory computer-readable medium which, when executed by one or more processors, cause said one or more processors to perform operations of:
      receiving a desired liability coverage level for automobile insurance coverage;
      determining a risk of loss associated with said received desired coverage level, the risk loss determined in part based on profile of a driver of a vehicle covered by the automobile insurance coverage;
      determining a maturity level for said self-insurance account based on a function of said received desired coverage level, said risks associated with the received desired liability coverage level, said risk of loss associated with the received desired coverage level, and an expected rate of growth of an investment vehicle;
      receiving deposit payments for said self-insurance account;
      investing at least part of an amount in said self-insurance account in said investment vehicle;
      presenting an option to discontinue said payments into said account when said amount in said account reaches said maturity level;
      maintaining said self-insurance account to provide said at least one type of insurance;
      presenting a value of said self-insurance; account to said insured in response to a request from said insured; and
      terminating said self-insurance account in response to a termination request.

8. The method of claim 7, wherein said receiving deposit payments comprises receiving periodic payments.

9. The method of claim 7, wherein receiving said deposit payments comprises receiving a lump sum payment.

10. The method of claim 7, wherein said investment vehicle is a tax deferred vehicle.

11. The method of claim 7, wherein said self-insurance account is coupled with another financial product.

12. The method of claim 7, wherein said receiving deposit payments further comprises receiving deposit payments in conjunction with at least one triggering event.

13. A non-transitory computer-readable medium comprising computer-readable instructions for providing a self-insurance account, said self-insurance account configured to provide at least one type of insurance coverage to an insured, the computer-readable instructions comprising instructions, which when executed by one or more processors, cause said one or more processors to:
   receive a desired liability coverage level for automobile insurance coverage;
   determine a risk of loss associated with said received desired coverage level, the risk of loss determined in part based on a profile of a driver of a vehicle covered by the automobile insurance coverage;
   determine a maturity level for said self-insurance account based on a function of said received desired liability coverage level, said risk of associated with the received desired coverage level, and an expected rate of growth of an investment vehicle;
   receive deposit payments for said self-insurance account;
   invest at least part of an amount in said self-insurance account said investment vehicle;
   present an option to discontinue said payments into said account when said amount in said account reaches said maturity level;
   maintain said self-insurance account to provide said at least one type of insurance;
   present value of said self-insurance account to said insured in response to a request from said insured; and
   terminate said self-insurance account in response to a termination request.

14. The non-transitory computer-readable medium of claim 13, wherein said instructions to receive deposit payments further comprise instructions, which when executed by said one or more processors, cause said one or more processors to receive periodic payments.

15. The non-transitory computer-readable medium of claim 13, wherein said instructions to receive deposit payments further comprise instructions, which when executed by said one or more processors, cause said one or more processors to receive a lump sum payment.

16. The non-transitory computer-readable medium of claim 13, wherein said investment vehicle is a tax deferred vehicle.

17. The non-transitory computer-readable medium of claim 13, wherein said self-insurance account is coupled with another financial product.

18. The non-transitory computer-readable medium of claim 13, wherein said instructions to receive deposit payments further instructions, which when executed by said one or more processors, cause said one or more processors to receive deposit payments in conjunction with at least one triggering event.

* * * * *